United States Patent
Barkan et al.

(10) Patent No.: US 9,692,762 B2
(45) Date of Patent: Jun. 27, 2017

(54) SYSTEMS AND METHODS FOR EFFICIENT DETECTION OF FINGERPRINTED DATA AND INFORMATION

(71) Applicant: Websense, LLC, Austin, TX (US)

(72) Inventors: Roy Barkan, Tel Aviv (IL); David Lazarov, Petah Tikva (IL); Yevgeny Menaker, Raanana (IL); Lidror Troyansky, Givatayim (IL)

(73) Assignee: Websense, LLC, Austin, TX (US)

( * ) Notice: Subject to any disclaimer, the term of this patent is extended or adjusted under 35 U.S.C. 154(b) by 0 days.

(21) Appl. No.: 14/845,816

(22) Filed: Sep. 4, 2015

(65) Prior Publication Data

US 2015/0381626 A1 Dec. 31, 2015

Related U.S. Application Data

(63) Continuation of application No. 12/453,284, filed on May 24, 2010, now Pat. No. 9,130,972.

(60) Provisional application No. 61/181,185, filed on May 26, 2009.

(51) Int. Cl.
| | |
|---|---|
| *G06F 7/04* | (2006.01) |
| *H04L 29/06* | (2006.01) |
| *G06F 21/10* | (2013.01) |
| *G06F 17/30* | (2006.01) |
| *G06F 21/60* | (2013.01) |

(52) U.S. Cl.
CPC ........ *H04L 63/10* (2013.01); *G06F 17/30312* (2013.01); *G06F 21/10* (2013.01); *G06F 21/606* (2013.01); *H04L 63/12* (2013.01); *G06F 2221/0737* (2013.01); *G06F 2221/2101* (2013.01)

(58) Field of Classification Search
None
See application file for complete search history.

(56) References Cited

U.S. PATENT DOCUMENTS

| | | |
|---|---|---|
| 4,423,414 A | 12/1983 | Bryant et al. |
| 4,734,036 A | 3/1988 | Kasha |
| 4,941,084 A | 7/1990 | Terada et al. |
| 5,124,984 A | 6/1992 | Engel |
| 5,408,642 A | 4/1995 | Mann |
| 5,414,833 A | 5/1995 | Hershey et al. |
| 5,493,692 A | 2/1996 | Theimer et al. |
| 5,541,911 A | 7/1996 | Nilakantan et al. |
| 5,548,729 A | 8/1996 | Akiyoshi et al. |

(Continued)

OTHER PUBLICATIONS

"European Application Serial No. 10730282.0, Communication Pursuant to Article 94(3) EPC mailed Aug. 4, 2014", 5 pgs.

(Continued)

*Primary Examiner* — Esther B Henderson
(74) *Attorney, Agent, or Firm* — Schwegman Lundberg & Woessner, P.A.

(57) ABSTRACT

The disclosed embodiments provide systems, methods, and apparatus for efficient detection of fingerprinted content and relate generally to the field of information (or data) leak prevention. Particularly, a compact and efficient repository of fingerprint ingredients is used to analyze content and determine the content's similarity to previously fingerprinted content. Some embodiments employ probabilistic indications regarding the existence of fingerprint ingredients in the repository.

20 Claims, 10 Drawing Sheets

(56) References Cited

U.S. PATENT DOCUMENTS

| | | |
|---|---|---|
| 5,555,376 A | 9/1996 | Theimer et al. |
| 5,581,703 A | 12/1996 | Baugher et al. |
| 5,581,804 A | 12/1996 | Cameron et al. |
| 5,586,121 A | 12/1996 | Moura et al. |
| 5,590,403 A | 12/1996 | Cameron et al. |
| 5,596,330 A | 1/1997 | Yokev et al. |
| 5,606,668 A | 2/1997 | Shwed |
| 5,623,601 A | 4/1997 | Vu |
| 5,648,965 A | 7/1997 | Thadani et al. |
| 5,678,041 A | 10/1997 | Baker et al. |
| 5,682,325 A | 10/1997 | Lightfoot et al. |
| 5,696,486 A | 12/1997 | Poliquin et al. |
| 5,696,898 A | 12/1997 | Baker et al. |
| 5,699,513 A | 12/1997 | Feigen et al. |
| 5,706,507 A | 1/1998 | Schloss |
| 5,712,979 A | 1/1998 | Graber et al. |
| 5,720,033 A | 2/1998 | Deo |
| 5,724,576 A | 3/1998 | Letourneau |
| 5,727,146 A | 3/1998 | Savoldi et al. |
| 5,742,759 A | 4/1998 | Nessett et al. |
| 5,768,519 A | 6/1998 | Swift et al. |
| 5,774,668 A | 6/1998 | Choquier et al. |
| 5,781,801 A | 7/1998 | Flanagan et al. |
| 5,787,253 A | 7/1998 | McCreery et al. |
| 5,787,427 A | 7/1998 | Benantar et al. |
| 5,796,944 A | 8/1998 | Hill et al. |
| 5,799,002 A | 8/1998 | Krishnan |
| 5,801,747 A | 9/1998 | Bedard |
| 5,826,014 A | 10/1998 | Coley et al. |
| 5,828,833 A | 10/1998 | Belville et al. |
| 5,828,835 A | 10/1998 | Isfeld et al. |
| 5,832,212 A | 11/1998 | Cragun |
| 5,832,228 A | 11/1998 | Holden et al. |
| 5,832,503 A | 11/1998 | Malik et al. |
| 5,835,722 A | 11/1998 | Bradshaw et al. |
| 5,835,726 A | 11/1998 | Shwed et al. |
| 5,842,040 A | 11/1998 | Hughes et al. |
| 5,848,233 A | 12/1998 | Radia et al. |
| 5,848,412 A | 12/1998 | Rowland et al. |
| 5,850,523 A | 12/1998 | Gretta, Jr. |
| 5,855,020 A | 12/1998 | Kirsch |
| 5,864,683 A | 1/1999 | Boebert et al. |
| 5,884,033 A | 3/1999 | Duvall et al. |
| 5,884,325 A | 3/1999 | Bauer et al. |
| 5,889,958 A | 3/1999 | Willens |
| 5,892,905 A | 4/1999 | Brandt et al. |
| 5,896,502 A | 4/1999 | Shieh et al. |
| 5,898,830 A | 4/1999 | Wesinger, Jr. et al. |
| 5,899,991 A | 5/1999 | Karch |
| 5,899,995 A | 5/1999 | Millier et al. |
| 5,905,495 A | 5/1999 | Tanaka et al. |
| 5,911,043 A | 6/1999 | Duffy et al. |
| 5,919,257 A | 7/1999 | Trostle |
| 5,937,404 A | 8/1999 | Csaszar et al. |
| 5,941,947 A | 8/1999 | Brown et al. |
| 5,944,794 A | 8/1999 | Okamoto et al. |
| 5,950,195 A | 9/1999 | Stockwell et al. |
| 5,958,015 A | 9/1999 | Dascalu |
| 5,961,591 A | 10/1999 | Jones et al. |
| 5,963,941 A | 10/1999 | Hirakawa |
| 5,968,176 A | 10/1999 | Nessett et al. |
| 5,978,807 A | 11/1999 | Mano et al. |
| 5,983,270 A | 11/1999 | Abraham et al. |
| 5,983,279 A | 11/1999 | Lin et al. |
| 5,987,606 A | 11/1999 | Cirasole et al. |
| 5,987,611 A | 11/1999 | Freund |
| 5,991,807 A | 11/1999 | Schmidt et al. |
| 5,996,011 A | 11/1999 | Humes |
| 6,012,832 A | 1/2000 | Saunders |
| 6,052,723 A | 4/2000 | Ginn |
| 6,052,730 A | 4/2000 | Felciano et al. |
| 6,055,564 A | 4/2000 | Phaal |
| 6,061,798 A | 5/2000 | Coley et al. |
| 6,065,056 A | 5/2000 | Bradshaw et al. |
| 6,065,059 A | 5/2000 | Shieh et al. |
| 6,070,242 A | 5/2000 | Wong et al. |
| 6,073,135 A | 6/2000 | Broder et al. |
| 6,073,239 A | 6/2000 | Dotan |
| 6,085,241 A | 7/2000 | Otis |
| 6,092,194 A | 7/2000 | Touboul |
| 6,105,027 A | 8/2000 | Schneider et al. |
| 6,154,741 A | 11/2000 | Feldman |
| 6,173,364 B1 | 1/2001 | Zenchelsky et al. |
| 6,178,505 B1 | 1/2001 | Schneider et al. |
| 6,182,118 B1 | 1/2001 | Finney et al. |
| 6,185,681 B1 | 2/2001 | Zizzi |
| 6,219,667 B1 | 4/2001 | Lu et al. |
| 6,219,786 B1 | 4/2001 | Cunningham et al. |
| 6,226,664 B1 | 5/2001 | Ng et al. |
| 6,233,618 B1 | 5/2001 | Shannon |
| 6,233,686 B1 | 5/2001 | Zenchelsky et al. |
| 6,246,977 B1 | 6/2001 | Messerly et al. |
| 6,252,884 B1 | 6/2001 | Hunter |
| 6,253,188 B1 | 6/2001 | Witek et al. |
| 6,256,739 B1 | 7/2001 | Skopp et al. |
| 6,266,664 B1 | 7/2001 | Russell-falla et al. |
| 6,295,529 B1 | 9/2001 | Corston-oliver et al. |
| 6,295,559 B1 | 9/2001 | Emens et al. |
| 6,301,658 B1 | 10/2001 | Koehler |
| 6,338,088 B1 | 1/2002 | Waters et al. |
| 6,356,864 B1 | 3/2002 | Foltz et al. |
| 6,357,010 B1 | 3/2002 | Viets et al. |
| 6,377,577 B1 | 4/2002 | Bechtolsheim et al. |
| 6,389,472 B1 | 5/2002 | Hughes et al. |
| 6,418,433 B1 | 7/2002 | Chakrabarti et al. |
| 6,446,119 B1 | 9/2002 | Olah et al. |
| 6,456,306 B1 | 9/2002 | Chin et al. |
| 6,460,141 B1 | 10/2002 | Olden |
| 6,466,940 B1 | 10/2002 | Mills |
| 6,486,892 B1 | 11/2002 | Stern |
| 6,493,744 B1 | 12/2002 | Emens et al. |
| 6,493,758 B1 | 12/2002 | Mclain |
| 6,519,571 B1 | 2/2003 | Guheen et al. |
| 6,539,430 B1 | 3/2003 | Humes |
| 6,571,249 B1 | 5/2003 | Garrecht et al. |
| 6,606,659 B1 | 8/2003 | Hegli et al. |
| 6,654,787 B1 | 11/2003 | Aronson et al. |
| 6,675,169 B1 | 1/2004 | Bennett et al. |
| 6,741,997 B1 | 5/2004 | Liu |
| 6,742,003 B2 | 5/2004 | Heckerman et al. |
| 6,785,732 B1 | 8/2004 | Bates et al. |
| 6,804,780 B1 | 10/2004 | Touboul |
| 6,807,558 B1 | 10/2004 | Hassett et al. |
| 6,832,230 B1 | 12/2004 | Zilliacus et al. |
| 6,832,256 B1 | 12/2004 | Toga |
| 6,839,680 B1 | 1/2005 | Liu et al. |
| 6,894,991 B2 | 5/2005 | Ayyagari et al. |
| 6,947,985 B2 | 9/2005 | Hegli et al. |
| 6,978,292 B1 | 12/2005 | Murakami et al. |
| 6,984,991 B2 | 1/2006 | Bond et al. |
| 6,988,209 B1 | 1/2006 | Balasubramaniam et al. |
| 7,051,200 B1 | 5/2006 | Manferdelli |
| 7,058,822 B2 | 6/2006 | Edery et al. |
| 7,065,483 B2 | 6/2006 | Decary et al. |
| 7,080,000 B1 | 7/2006 | Cambridge |
| 7,089,246 B1 | 8/2006 | O'laughlen |
| 7,089,589 B2 | 8/2006 | Chefalas et al. |
| 7,093,293 B1 | 8/2006 | Smithson et al. |
| 7,096,493 B1 | 8/2006 | Liu |
| 7,100,199 B2 | 8/2006 | Ginter et al. |
| 7,136,867 B1 | 11/2006 | Chatterjee et al. |
| 7,155,243 B2 | 12/2006 | Baldwin et al. |
| 7,185,015 B2 | 2/2007 | Kester et al. |
| 7,185,361 B1 | 2/2007 | Ashoff et al. |
| 7,194,464 B2 | 3/2007 | Kester et al. |
| 7,197,713 B2 | 3/2007 | Stern |
| 7,209,893 B2 | 4/2007 | Nii |
| 7,213,069 B2 | 5/2007 | Anderson et al. |
| 7,249,175 B1 | 7/2007 | Donaldson |
| 7,260,583 B2 | 8/2007 | Wiener et al. |
| 7,313,823 B2 | 12/2007 | Gao |
| 7,346,512 B2 | 3/2008 | Li-Chun Wang et al. |
| 7,359,372 B2 | 4/2008 | Pelletier et al. |
| 7,370,365 B2 | 5/2008 | Carroll et al. |

(56) References Cited

U.S. PATENT DOCUMENTS

| | | |
|---|---|---|
| 7,376,154 B2 | 5/2008 | Ilnicki et al. |
| 7,376,969 B1 | 5/2008 | Njemanze et al. |
| 7,389,532 B2 | 6/2008 | Swander |
| 7,447,215 B2 | 11/2008 | Lynch et al. |
| 7,536,437 B2 | 5/2009 | Zmolek |
| 7,590,716 B2 | 9/2009 | Sinclair et al. |
| 7,603,685 B2 | 10/2009 | Knudson et al. |
| 7,603,687 B2 | 10/2009 | Pietraszak et al. |
| 7,617,532 B1 | 11/2009 | Alexander et al. |
| 7,634,463 B1 | 12/2009 | Katragadda et al. |
| 7,644,127 B2 | 1/2010 | Yu |
| RE41,168 E | 3/2010 | Shannon |
| 7,690,013 B1 | 3/2010 | Eldering et al. |
| 7,693,945 B1 | 4/2010 | Dulitz et al. |
| 7,707,157 B1 | 4/2010 | Shen |
| 7,725,937 B1 | 5/2010 | Levy |
| 7,783,706 B1 | 8/2010 | Robinson |
| 7,814,546 B1 | 10/2010 | Strayer et al. |
| 7,818,800 B1 | 10/2010 | Lemley, III et al. |
| 7,991,411 B2 | 8/2011 | Johnson, Jr. et al. |
| 8,078,625 B1 | 12/2011 | Zhang et al. |
| 8,095,118 B2 | 1/2012 | Boctor |
| 8,315,178 B2 | 11/2012 | Makhoul et al. |
| 8,498,628 B2 | 7/2013 | Shapiro et al. |
| 8,695,100 B1 | 4/2014 | Cosoi |
| 9,130,972 B2 | 9/2015 | Barkan et al. |
| 2001/0032205 A1 | 10/2001 | Kubaitis |
| 2001/0032258 A1 | 10/2001 | Ishida et al. |
| 2001/0039582 A1 | 11/2001 | McKinnon, III et al. |
| 2001/0047343 A1 | 11/2001 | Dahan et al. |
| 2001/0047474 A1 | 11/2001 | Takagi et al. |
| 2002/0042821 A1 | 4/2002 | Muret et al. |
| 2002/0049883 A1 | 4/2002 | Schneider et al. |
| 2002/0059221 A1 | 5/2002 | Whitehead et al. |
| 2002/0062359 A1 | 5/2002 | Klopp et al. |
| 2002/0073089 A1 | 6/2002 | Schwartz et al. |
| 2002/0078045 A1 | 6/2002 | Dutta |
| 2002/0087882 A1 | 7/2002 | Schneier et al. |
| 2002/0091947 A1 | 7/2002 | Nakamura |
| 2002/0095592 A1 | 7/2002 | Daniell et al. |
| 2002/0099952 A1 | 7/2002 | Lambert et al. |
| 2002/0103848 A1 | 8/2002 | Giacomini et al. |
| 2002/0110084 A1 | 8/2002 | Butt et al. |
| 2002/0120754 A1 | 8/2002 | Anderson et al. |
| 2002/0129039 A1 | 9/2002 | Majewski et al. |
| 2002/0129140 A1 | 9/2002 | Peled et al. |
| 2002/0129277 A1 | 9/2002 | Caccavale |
| 2002/0133509 A1 | 9/2002 | Johnston et al. |
| 2002/0144129 A1 | 10/2002 | Malivanchuk et al. |
| 2002/0152284 A1 | 10/2002 | Cambray et al. |
| 2002/0162015 A1 | 10/2002 | Tang |
| 2002/0174358 A1 | 11/2002 | Wolff et al. |
| 2002/0178374 A1 | 11/2002 | Swimmer et al. |
| 2002/0199095 A1 | 12/2002 | Bandini et al. |
| 2003/0005112 A1 | 1/2003 | Krautkremer |
| 2003/0009495 A1 | 1/2003 | Adjaoute |
| 2003/0018491 A1 | 1/2003 | Nakahara et al. |
| 2003/0018903 A1 | 1/2003 | Greca et al. |
| 2003/0023860 A1 | 1/2003 | Eatough et al. |
| 2003/0028564 A1 | 2/2003 | Sanfilippo |
| 2003/0033525 A1 | 2/2003 | Rajaram |
| 2003/0074567 A1 | 4/2003 | Charbonneau |
| 2003/0093694 A1 | 5/2003 | Medvinsky et al. |
| 2003/0097591 A1 | 5/2003 | Pham et al. |
| 2003/0097617 A1 | 5/2003 | Goeller et al. |
| 2003/0105863 A1 | 6/2003 | Hegli et al. |
| 2003/0126136 A1 | 7/2003 | Omoigui |
| 2003/0126139 A1 | 7/2003 | Lee et al. |
| 2003/0135611 A1 | 7/2003 | Kemp et al. |
| 2003/0135756 A1 | 7/2003 | Verma |
| 2003/0149692 A1 | 8/2003 | Mitchell |
| 2003/0149930 A1 | 8/2003 | Rey et al. |
| 2003/0167257 A1 | 9/2003 | De Bonet |
| 2003/0172292 A1 | 9/2003 | Judge |
| 2003/0177187 A1 | 9/2003 | Levine et al. |
| 2003/0177361 A1 | 9/2003 | Wheeler et al. |
| 2003/0182420 A1 | 9/2003 | Jones et al. |
| 2003/0185395 A1 | 10/2003 | Lee et al. |
| 2003/0185399 A1 | 10/2003 | Ishiguro |
| 2003/0188197 A1 | 10/2003 | Miyata et al. |
| 2003/0202536 A1 | 10/2003 | Foster et al. |
| 2004/0003139 A1 | 1/2004 | Cottrille et al. |
| 2004/0003286 A1 | 1/2004 | Kaler et al. |
| 2004/0006621 A1 | 1/2004 | Bellinson et al. |
| 2004/0015586 A1 | 1/2004 | Hegli et al. |
| 2004/0019656 A1 | 1/2004 | Smith et al. |
| 2004/0034794 A1 | 2/2004 | Mayer et al. |
| 2004/0039921 A1* | 2/2004 | Chuang ................ G06F 21/565 713/187 |
| 2004/0049514 A1 | 3/2004 | Burkov |
| 2004/0054521 A1 | 3/2004 | Liu |
| 2004/0062106 A1 | 4/2004 | Ramesh et al. |
| 2004/0068479 A1 | 4/2004 | Wolfson et al. |
| 2004/0078591 A1 | 4/2004 | Teixeira et al. |
| 2004/0105416 A1 | 6/2004 | Rue |
| 2004/0111499 A1 | 6/2004 | Dobrowski et al. |
| 2004/0111632 A1 | 6/2004 | Halperin |
| 2004/0117624 A1 | 6/2004 | Brandt et al. |
| 2004/0123157 A1 | 6/2004 | Alagna et al. |
| 2004/0128285 A1 | 7/2004 | Green et al. |
| 2004/0139351 A1 | 7/2004 | Tsang |
| 2004/0153305 A1 | 8/2004 | Enescu et al. |
| 2004/0153644 A1 | 8/2004 | Mccorkendale et al. |
| 2004/0162876 A1 | 8/2004 | Kohavi |
| 2004/0181788 A1 | 9/2004 | Kester et al. |
| 2004/0187029 A1 | 9/2004 | Ting |
| 2004/0203615 A1 | 10/2004 | Qu |
| 2004/0220924 A1 | 11/2004 | Wootton |
| 2004/0255147 A1 | 12/2004 | Peled et al. |
| 2004/0260924 A1 | 12/2004 | Peled et al. |
| 2005/0005165 A1 | 1/2005 | Morgan et al. |
| 2005/0015626 A1 | 1/2005 | Chasin |
| 2005/0025291 A1 | 2/2005 | Peled et al. |
| 2005/0027980 A1 | 2/2005 | Peled et al. |
| 2005/0033967 A1 | 2/2005 | Morino et al. |
| 2005/0048958 A1 | 3/2005 | Mousseau et al. |
| 2005/0055327 A1 | 3/2005 | Agrawal et al. |
| 2005/0060140 A1 | 3/2005 | Maddox |
| 2005/0066197 A1 | 3/2005 | Hirata et al. |
| 2005/0071748 A1 | 3/2005 | Shipp |
| 2005/0086520 A1 | 4/2005 | Dharmapurikar et al. |
| 2005/0091535 A1 | 4/2005 | Kavalam et al. |
| 2005/0108557 A1 | 5/2005 | Kayo et al. |
| 2005/0111367 A1 | 5/2005 | Chao et al. |
| 2005/0120229 A1 | 6/2005 | Lahti |
| 2005/0131868 A1 | 6/2005 | Lin et al. |
| 2005/0132042 A1 | 6/2005 | Cryer |
| 2005/0132184 A1 | 6/2005 | Palliyil et al. |
| 2005/0138109 A1 | 6/2005 | Redlich et al. |
| 2005/0138353 A1 | 6/2005 | Spies |
| 2005/0149726 A1 | 7/2005 | Joshi et al. |
| 2005/0155012 A1 | 7/2005 | Tayama et al. |
| 2005/0210035 A1 | 9/2005 | Kester et al. |
| 2005/0223001 A1 | 10/2005 | Kester et al. |
| 2005/0229250 A1 | 10/2005 | Ring et al. |
| 2005/0251862 A1 | 11/2005 | Talvitie |
| 2005/0273858 A1 | 12/2005 | Zadok et al. |
| 2005/0283836 A1 | 12/2005 | Lalonde et al. |
| 2005/0288939 A1 | 12/2005 | Peled et al. |
| 2006/0004636 A1 | 1/2006 | Kester et al. |
| 2006/0004717 A1 | 1/2006 | Ramarathnam et al. |
| 2006/0020814 A1 | 1/2006 | Lieblich et al. |
| 2006/0021031 A1 | 1/2006 | Leahy et al. |
| 2006/0026105 A1 | 2/2006 | Endoh |
| 2006/0026681 A1 | 2/2006 | Zakas |
| 2006/0031504 A1 | 2/2006 | Hegli et al. |
| 2006/0036874 A1 | 2/2006 | Cockerille et al. |
| 2006/0053488 A1 | 3/2006 | Sinclair et al. |
| 2006/0068755 A1 | 3/2006 | Shraim et al. |
| 2006/0075494 A1 | 4/2006 | Bertman et al. |
| 2006/0080735 A1 | 4/2006 | Brinson et al. |
| 2006/0095404 A1 | 5/2006 | Adelman et al. |
| 2006/0095459 A1 | 5/2006 | Adelman et al. |
| 2006/0095586 A1 | 5/2006 | Adelman et al. |

(56) References Cited

U.S. PATENT DOCUMENTS

| | | |
|---|---|---|
| 2006/0095965 A1 | 5/2006 | Phillips et al. |
| 2006/0098585 A1 | 5/2006 | Singh et al. |
| 2006/0101514 A1 | 5/2006 | Milener et al. |
| 2006/0129644 A1 | 6/2006 | Owen et al. |
| 2006/0161986 A1 | 7/2006 | Singh et al. |
| 2006/0168006 A1 | 7/2006 | Shannon et al. |
| 2006/0191008 A1 | 8/2006 | Fernando et al. |
| 2006/0212723 A1 | 9/2006 | Sheymov |
| 2006/0251068 A1 | 11/2006 | Judge et al. |
| 2006/0259948 A1 | 11/2006 | Calow et al. |
| 2006/0265750 A1 | 11/2006 | Huddleston et al. |
| 2006/0272024 A1 | 11/2006 | Huang et al. |
| 2006/0277259 A1 | 12/2006 | Murphy et al. |
| 2006/0282890 A1 | 12/2006 | Gruper et al. |
| 2006/0288076 A1 | 12/2006 | Cowings et al. |
| 2007/0005762 A1 | 1/2007 | Knox et al. |
| 2007/0011739 A1 | 1/2007 | Zamir et al. |
| 2007/0027965 A1 | 2/2007 | Brenes et al. |
| 2007/0028302 A1 | 2/2007 | Brennan |
| 2007/0067844 A1 | 3/2007 | Williamson et al. |
| 2007/0130351 A1 | 6/2007 | Alperovitch et al. |
| 2007/0143424 A1 | 6/2007 | Schirmer et al. |
| 2007/0150827 A1 | 6/2007 | Singh et al. |
| 2007/0156833 A1 | 7/2007 | Nikolov |
| 2007/0195779 A1 | 8/2007 | Judge et al. |
| 2007/0199054 A1 | 8/2007 | Florencio et al. |
| 2007/0204223 A1 | 8/2007 | Bartels et al. |
| 2007/0220607 A1 | 9/2007 | Sprosts et al. |
| 2007/0260602 A1 | 11/2007 | Taylor |
| 2007/0261112 A1 | 11/2007 | Todd et al. |
| 2007/0294199 A1 | 12/2007 | Nelken et al. |
| 2007/0294428 A1 | 12/2007 | Guy et al. |
| 2007/0299915 A1 | 12/2007 | Shraim et al. |
| 2008/0009268 A1 | 1/2008 | Ramer et al. |
| 2008/0040804 A1 | 2/2008 | Oliver et al. |
| 2008/0047017 A1 | 2/2008 | Renaud |
| 2008/0100414 A1* | 5/2008 | Diab .................. G06F 21/32 340/5.1 |
| 2008/0262991 A1 | 10/2008 | Kapoor et al. |
| 2008/0267144 A1 | 10/2008 | Jano et al. |
| 2008/0282338 A1 | 11/2008 | Beer |
| 2008/0282344 A1 | 11/2008 | Shuster |
| 2008/0295177 A1 | 11/2008 | Dettinger et al. |
| 2009/0064326 A1 | 3/2009 | Goldstein |
| 2009/0100055 A1 | 4/2009 | Wang |
| 2009/0100518 A1 | 4/2009 | Overcash |
| 2009/0119402 A1 | 5/2009 | Shull et al. |
| 2009/0131035 A1 | 5/2009 | Aiglstorfer |
| 2009/0241191 A1 | 9/2009 | Keromytis et al. |
| 2009/0320135 A1 | 12/2009 | Cavanaugh |
| 2010/0005165 A1 | 1/2010 | Sinclair et al. |
| 2010/0024037 A1 | 1/2010 | Grzymala-busse et al. |
| 2010/0064347 A1 | 3/2010 | More et al. |
| 2010/0069127 A1 | 3/2010 | Fiennes |
| 2010/0077483 A1 | 3/2010 | Stolfo et al. |
| 2010/0198928 A1 | 8/2010 | Almeida |
| 2010/0312843 A1 | 12/2010 | Robinson |

OTHER PUBLICATIONS

"European Application Serial No. 10730282.0, Response filed Jul. 13, 2012 to Communication pursuant to Rules 161(2) and 162 EPC mailed Jan. 13, 2012", 12 pgs.

"International Application Serial No. PCT/US2010/035992, International Preliminary Report on Patentability mailed Dec. 8, 2011", 7 pgs.

"International Application Serial No. PCT/US2010/035992, Written Opinion mailed Aug. 11, 2010", 5 pgs.

* cited by examiner 612            610

Lorem ipsum dolor sit amet, consectetur
adipiscing elit. Maecenas tempus ipsum in eros. In
ut mauris adipiscing risus feugiat accumsan. Proin
urna. Etiam fermentum nisl vel justo. Duis
eleifend rutrum nisl. Duis vel sapien ac nunc
ullamcorper malesuada. Duis facilisis nulla a
lectus.

He was thoughtful and grave--but the orders he gave
Were enough to bewilder a crew.
When he cried "Steer to starboard, but keep her head larboard!"
What on earth was the helmsman to do? Then the bowsprit got mixed
with the rudder sometimes:
A thing, as the Bellman remarked,
That frequently happens in tropical climes,
When a vessel is, so to speak, "snarked." But the principal failing
occurred in the sailing,
And the Bellman, perplexed and distressed,

614

620

Lorem ipsum dolor sit amet, consectetur adipiscing elit.
Maecenas tempus ipsum in eros. In ut mauris adipiscing
risus feugiat accumsan. Proin urna. Etiam fermentum nisl vel
justo. Duis eleifend rutrum nisl. Duis vel sapien ac nunc
ullamcorper malesuada. Duis facilisis nulla a lectus. Integer
tincidunt orci tempus libero. Nullam erat. Vestibulum
posuere nisi in tortor vehicula tincidunt. Aliquam porttitor,
diam id hendrerit tristique, lacus nisl aliquet mi, at consequat
pede lacus eget sem. Donec adipiscing, dolor nec varius
consequat, ligula urna venenatis pede, pretium condimentum
elit augue sit amet nisl. Praesent dolor. Nullam nisl orci,
vestibulum aliquam, pretium a, rutrum eget, dolor. Duis
placerat leo molestie nulla. Vivamus vehicula nisl eget dui.
Nulla volutpat adipiscing felis. Lorem ipsum dolor sit amet,
consectetur adipiscing elit. Nam commodo arcu in augue.
Pellentesque lectus odio, vehicula in, convallis a, cursus et,
arcu.

Pellentesque fringilla nulla sed magna. Duis varius neque.
Fusce arcu magna, feugiat a, varius id, molestie sed, pede.
Aliquam pulvinar. Mauris eget dolor. Sed fermentum pede
non ipsum. Integer nisi. Morbi ante. Nunc vulputate, purus ut
venenatis facilisis, mi odio commodo erat, sed bibendum
turpis erat eu lorem. Pellentesque convallis. Curabitur
tempor ipsum sed ante. Proin tristique libero vel quam.
Aenean egestas arcu eu velit. Fusce condimentum rhoncus
lectus.

630 —
640 —

| X | X | X | X | X | X | X | X | X | X | X |
|---|---|---|---|---|---|---|---|---|---|---|
| X | X | X | X | X | X | X | X | X | X | X |
| X |   | X |   |   | X |   | X |   |   |   |
| X |   | X | X |   |   | X |   | X |   |   |
| X |   | X |   | X | X |   | X |   | X |   |

Fig 7

SYSTEMS AND METHODS FOR EFFICIENT DETECTION OF FINGERPRINTED DATA AND INFORMATION

CROSS-REFERENCE TO RELATED APPLICATIONS

This application is a continuation application of U.S. application Ser. No. 12/786,284 (now U.S. Pat. No. 9,130,972), filed May 24, 2010 and entitled "SYSTEMS AND METHODS FOR EFFICIENT DETECTION OF FINGERPRINTED DATA AND INFORMATION," which claims priority to U.S. Provisional Patent Application No. 61/181,185, filed May 26, 2009. The disclosures of these prior applications are considered part of this application, and are hereby incorporated by reference in their entirety.

BACKGROUND

Field

The field of invention relates to systems and methods for efficient and accurate detection of fingerprint information.

Description of the Related Art

Information and knowledge created and accumulated by organizations and businesses are, in many cases, their most valuable assets. Unauthorized dissemination of intellectual property, financial information and other confidential or sensitive information can significantly damage a company's reputation and competitive advantage. In addition, individuals' private information inside organizations, as well as private information of clients, customers and business partners may include sensitive details that can be abused by users with criminal intentions.

Apart from the damage to business secrecy and reputation, regulations within the US and abroad pose substantial legal liabilities for information leakage. Regulations such as the Health Insurance Portability and Accountability Act (HIPAA), the Gramm-Leach-Bliley act (GLBA) and the privacy-protecting laws of various states and nations imply that the information assets within organizations should be monitored and subjected to an information protection policy in order to protect client's privacy and to mitigate the risks of potential misuse and fraud.

A file may be divided into fragments. A subset of the hashes of these fragments may then be used as "fingerprints" of the document. A file may be divided into fragments in one of two ways: 1) division and 2) phrasing. "Division" comprises dividing the file into a subsequence of n items known as an n-gram. The divisions covered by these n-grams may overlap (a condition known as "shingling"). N-grams may be generated by applying a "sliding window" over the text. Each "window" comprises a given number of characters or words, and from the content of each "window", a hash-value is calculated.

"Phrasing" comprises dividing the content into phrases, using a separator, such as commas, semi-colons or sentence boundaries. A hash-value is calculated from the content of each phrase. The set of hashes may thereafter be post-selected, or "diluted", in order to reduce storage and enhance performance by selecting hash-values that are divisible by a certain integer p. For example, if p=5, then, on average, one-fifth of the hashes will be selected.

To assess the similarity level between two texts (i.e., documents), each text is first canonized by bringing the document into a standard format used by the detection system (for example by converting the textual content to lowercase Unicode letters, removal of common words (also known as "stopwords") like "the" and "is" and other "noise", etc.). Additionally, "stemming" may be performed, which comprises reducing inflected (or sometimes derived) words to their stem, base or root form.

A similarity measure is used to compare two fingerprints of canonized texts. One similarity measure is the Jaccard similarity measure, which defines the similarity between documents A and B as:

$$\frac{|A \cap B|}{|A \cup B|}$$

Where the intersection $|A \cap B|$ is defined by the number of hashes the fingerprints of the two documents have in common.

However, Applicants have recognized that for at least the reason that fingerprint size is proportional to the size of the fingerprinted content, fingerprinting large amounts of content, in a manner that will facilitate robust identification, requires an allocation of considerable memory resources. It is generally hard to maintain a large repository in the readily available Random Access Memory (RAM). The detection process may also require expensive accesses to disk storage. These memory requirements hamper performance and the problem is particularly apparent when employing fingerprint-based detection at endpoints, such as laptops and desktops.

The present embodiments contemplate novel methods and systems for efficient detection of fingerprinted information, which overcome the drawbacks and inefficiencies of the current methods described above.

SUMMARY

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Certain Embodiments," one will understand how the features of this invention provide advantages over other display devices.

Certain embodiments contemplate a system for compacting fingerprints of electronic content comprising a compact representation module having a processor, the processor configured to hash the contents of the electronic content to create an electronic fingerprint of the content. The processor of the compact representation module may be configured to perform multiple hashes of the electronic content and generate multiple fingerprints of the electronic content. In some embodiments, the system may further comprise a compact repository for storing the fingerprints of the electronic content. In certain embodiments the system comprises an analysis module having a processor and configured to hash new content and generate a fingerprint for the new content.

In some embodiments the system may comprise a match estimator for comparing fingerprints stored in the compact repository with fingerprints of the new content. The match estimator may determine whether fingerprints match based upon the probability that a match exists within the compact repository. In some embodiments the system comprises a decision module configured to apply a transmission policy on the new content based upon the probability that a match exists between the fingerprint of the new content and a fingerprint stored in the compact repository.

Some embodiments comprise a system for applying a transmission policy on electronic content stored in an electronic network, the system comprising: a scanning engine having a processor and configured to identify electronic content; a fingerprinting module in electronic communication with the scanning engine and configured to hash the electronic content in order to generate a compact fingerprint of the electronic content identified by the scanning engine; and at least one compact fingerprint repository in electronic communication with the fingerprinting module and configured to store fingerprints generated by the fingerprinting module. The system may further comprise a content processor in electronic communication with the electronic network, the content processor configured to hash new electronic content of the electronic network and a match estimator in electronic communication with the fingerprint repository and the content processor.

In some embodiments the match estimator my be configured to determine probabilistic matches between the fingerprint of the new electronic content and a fingerprint stored in the fingerprint repository; a decision module in electronic communication with the match estimator and the electronic network, the decision module configured to apply the transmission policy to the new electronic content based upon an output from the match estimator. In some embodiments the system may further comprise a fingerprint repository in electronic communication with the fingerprinting module, the fingerprinting module being configured to generate a hash of the electronic content and to store it in the fingerprint repository. In some embodiments, the match estimator may be configured to determine a match based upon a distance between matched hashes.

Certain embodiments contemplate a method of transmitting electronic content over an electronic network, the method comprising the steps: identifying electronic content on the electronic network with a scanning engine; fingerprinting the electronic content with at least one hash to generate a compact fingerprint of the electronic content; storing at least one compact fingerprint in a compact fingerprint repository; fingerprinting new electronic content with at least one hash, the new electronic content to be transmitted over the electronic network; comparing the fingerprint of the new electronic content with fingerprints stored in the compact fingerprint repository; and determining whether to transmit the new electronic content over the electronic network in response to the comparison of the fingerprints.

In certain embodiments the method further comprises the step of applying a transmission policy to the new electronic content in response to determining whether the new electronic content should be transmitted. The step of determining whether the new electronic content should be transmitted may comprise determining matches between fingerprints stored in the compact fingerprint repository and the fingerprint of the new electronic content. The step of determining matches may comprise determining the distances between matches of the fingerprints.

Certain embodiments contemplate a system for compacting fingerprints of an electronic content, the system comprising: one or more processors, wherein: at least one of the one or more processors is configured to receive at least a portion of a first electronic fingerprint; and at least one of the one or more processors is configured to flag one or more addresses in an array, the one or more addresses associated with the at least a portion of the first electronic fingerprint.

In some embodiments a hash function determines the associations of addresses to the at least a portion of the first fingerprint. In certain embodiments the hash function is configured such that at least one address is associated with two or more fingerprints. The system may further comprise a compact repository, the compact repository comprising an array of addresses, the addresses which are associated with a second fingerprint of a second electronic content being flagged. In some embodiments, the array addresses associated with the first fingerprint of the electronic content may be stored in the compact repository. In some embodiments, the array of addresses associated with the first fingerprint and the array of addresses associated with the second fingerprint may have no addresses associated with both the first and second fingerprint.

In certain embodiments, at least one of the one or more processors is configured to compare the flagged addresses associated with the first fingerprint and the flagged addresses associated with the second fingerprint, and to determine a probability that the fingerprints match. In some embodiments, at least one of the one or more processors is configured to apply a transmission policy to the electronic content based upon the probability that a match exists between the fingerprint of the electronic content and the fingerprints represented in the compact repository.

Certain embodiments contemplate a system for applying a transmission policy on electronic content stored in an electronic network. These systems may comprise a scanning engine processor configured to identify electronic content; a hashing processor configured to receive at least a portion of an electronic fingerprint of the electronic content identified by the scanning engine processor, the hashing processor further configured to flag a plurality of addresses associated with the at least a portion of an electronic fingerprint in an array, the hashing processor in electrical communication with the scanning engine processor; where at least one compact fingerprint repository may be in electrical communication with the hashing processor and configured to store the array associated with the at least a portion of an electronic fingerprint. The system may further comprise a content processor in electrical communication with the electronic network, the content processor configured to generate fingerprints of new electronic content of the electronic network. The system may also comprise a match estimation processor in electrical communication with the fingerprint repository and the content processor, the match estimation processor configured to determine probabilistic matches between the fingerprint of the new electronic content and the fingerprints stored in the fingerprint repository. The system may also comprise a decision processor in electrical communication with the match estimation processor and the electronic network, the decision processor configured to apply the transmission policy to the new electronic content based upon an output from the match estimation processor.

In certain embodiments at least two of the scanning engine processor, hashing processor, content processor, match estimation processor, and decision processor, may comprise a single processor. Some embodiments may also comprise a non-compact fingerprint repository in electrical communication with the hashing processor. In some embodiments the match estimation processor may be further configured to determine a match based upon a distance between two fingerprints.

Certain embodiments contemplate a method of transmitting electronic content over an electronic network comprising: performing the following on one or more electronic processors: identifying electronic content on the electronic network; generating a new fingerprint of the electronic content; comparing the new fingerprint of the electronic content with fingerprints stored in a compact fingerprint repository, comprising determining the one or more addresses flagged by new fingerprint when applied to a hash function and comparing these addresses with the one or more addresses flagged by the fingerprint of the repository when applied to the hash function; and determining whether to transmit the new electronic content over the electronic network in response to the comparison of the fingerprints.

In some embodiments, determining whether to transmit the new electronic content comprises applying a transmission policy to the new electronic content. In some embodiments, determining whether to transmit the new electronic content over the electronic network depends at least in part on the comparing the new fingerprint of the electronic content with fingerprints stored in the compact fingerprint repository. In some embodiments, the step of determining matches comprises determining the distances between matches of the fingerprints.

Certain embodiments contemplate a computer-readable medium comprising code configured to cause one or more processors to perform the following: receiving at least a portion of a first electronic fingerprint; flagging one or more addresses in an array, the one or more addresses associated with the at least a portion of the first electronic fingerprint; storing the array; receiving at least a portion of a second electronic fingerprint; determining if an address associated with the at least a portion of the second electronic fingerprint is the same as an address associated with the first electronic fingerprint.

In certain embodiments the first electronic fingerprint is associated with a first electronic document and the second electronic fingerprint is associated with a second electronic document. In certain embodiments, the one or more processors are further configured to determine a probability that the first electronic document and the second electronic document are the same based on at least the determining if an addresses associated with the at least a portion of the second electronic fingerprint is the same as an address associated with the first electronic fingerprint. In some embodiments the array is stored in a compact repository.

BRIEF DESCRIPTION OF THE DRAWINGS

FIG. 7 is a block diagram illustrating a situation in which the analyzed content contains one section from fingerprinted content and another section from un-fingerprinted content.

DETAILED DESCRIPTION OF CERTAIN EMBODIMENTS

Figure 1:
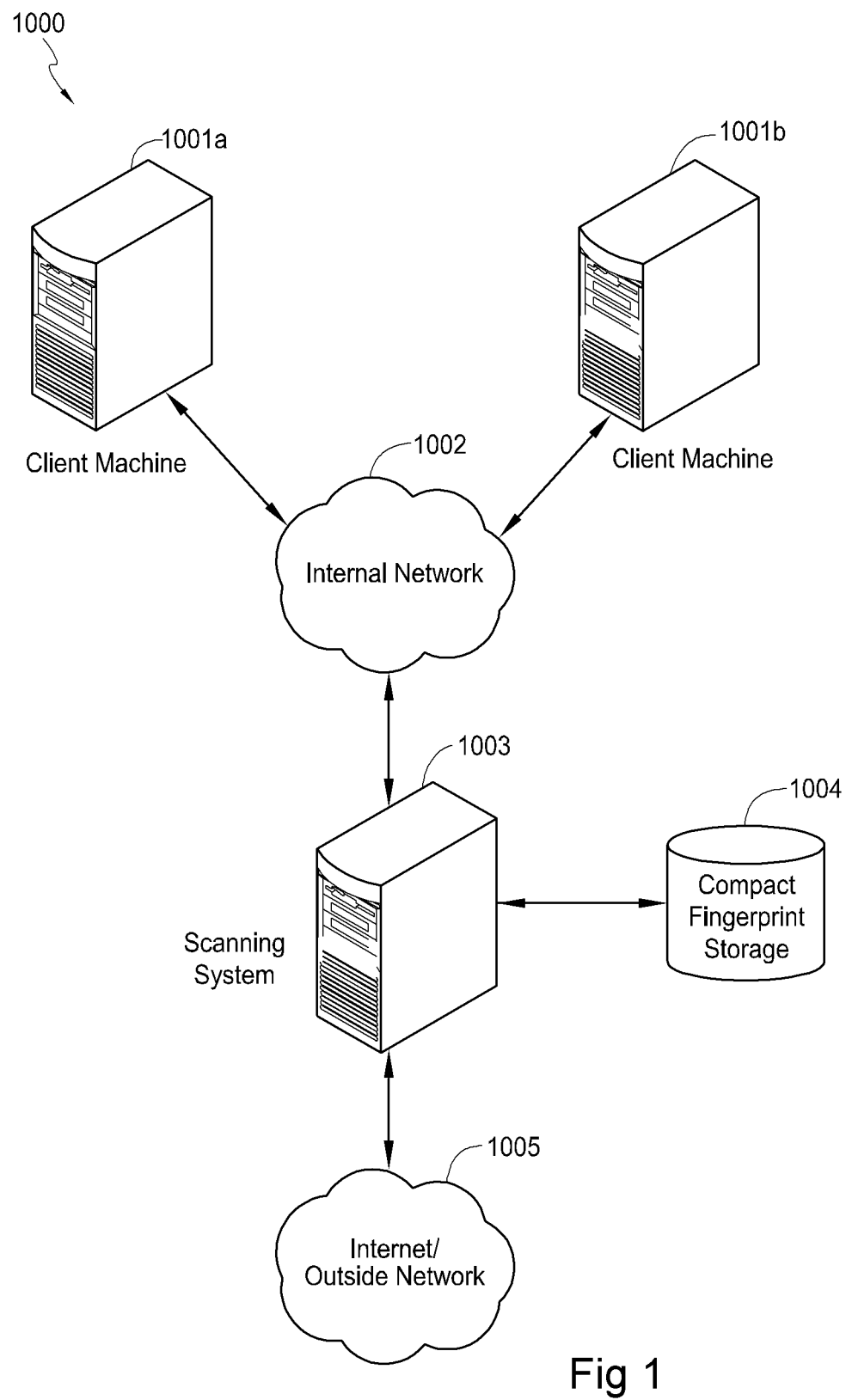
FIG. 1 is a block diagram illustrating a networked system comprising a scanning system which makes reference to a compact fingerprint repository.

The following detailed description is directed to certain specific embodiments. However, the teachings herein can be applied in a multitude of different ways. In this description, reference is made to the drawings wherein like parts are designated with like numerals throughout. The embodiments may be implemented in a variety of devices comprising computational functionality. Particularly, it is contemplated that the embodiments may be implemented in or associated with a variety of electronic devices such as, but not limited to, database storage systems, mobile telephones, wireless devices, personal data assistants (PDAs), hand-held or portable computers, GPS receivers/navigators, cameras, MP3 players, game consoles, portable electronic reading devices, and the like.

It will be recognized that the described components are illustrative and non-limiting and may be implemented in software, hardware or the combination of both. Particularly, the following figures make reference to certain features of various embodiments as being modules, systems, storage, engines, interfaces, and the like. One would recognize that each of these features may be implemented in hardware, software, or firmware. Furthermore, the features may reside independently from one another on separate software or hardware components, or may be found together on a single component.

The following embodiments describe systems, methods, and apparatus for efficient detection of fingerprinted content. Particularly, a compact and efficient repository of fingerprint ingredients is used to analyze content and determine the content's similarity to previously fingerprinted content. Some embodiments employ probabilistic indications regarding the existence of fingerprint ingredients in the repository. The system may be particularly useful when utilized within a system for information (or data) leak prevention.

Information fingerprinting is one method for monitoring and blocking unauthorized dissemination and usage of confidential and sensitive information. The following publications, each of which is incorporated by reference in its entirety, provide a cursory overview of fingerprinting methods: US Pat. Pub. No. 20020129140; US Pat. Pub. No. 20050288939; U.S. Pat. Pub. No. 20040255147; U. S. Pat. Pub. No. 20040260924; U.S. Pat. No. 7,493,650; U. S. Pat. App. No. 20050025291.

A fingerprint, $FP(C_M)$, may be defined as the set:

$$FP(C_M)=\{H(X_i)|g(C_M,H(X_i),\xi)=0\}$$

Where:

$C_M$=the Mth Information Item (e.g., a document or a spreadsheet);

H is a universal hash function;

$X_i$ is a vector of length N, where N is the size of the "sliding window." The vector can be generally described by:

$$X_i[k]=W_k Cr_{i-N+k}$$

Where:
- $W_j$: =Weighting factors that determine the shape of the window
- {Cr}=Elementary taxonomic units by which the window is defined (e.g., words or characters).
- g=Selection function, (such as selecting only these that are divisible by ξ). The function g can be a function of the hash itself, but in general also of the document to be fingerprinted (its size, average word length, etc), and ξ, the security parameter, which determines how many hashes will be saved.

Intuitively, ξ may be viewed as a parameter that determines the size of the holes in a "textual sieve." These holes may determine the size of the maximal excerpt not represented by a hash value. In general, one can select "wider holes" for less sensitive content. The selection of the hashes to be saved can be done in several ways such as by selecting only hashes that are divisible by a number p ("zero mod p"). In this case, ξ=p and $$g(C_M, H(X_i), \xi) = H(X_i) \bmod(p)$$

Effective similarity measures may require that a fingerprint be sufficiently "faithful" to the original content it represents, that the similarity of the original content can be measured by the similarity of the fingerprints. Particularly, the similarity level $d(C_A, C_B)$ between two documents, $C_A$ and $C_B$, may be estimated using the similarity between their respective fingerprints $d(FP(C_A), FP(C_B))$. We define the fingerprinting scheme FP to be an "(ϵ, δ) faithful representation", for some (ϵ, δ)>0 if:

$$d(FP(C_A), FP(C_B)) < \epsilon \rightarrow d(C_A, C_B) < \delta$$

As mentioned, fingerprint size comprises a primary obstacle to the efficient implementation of document identification. If the system should be able to detect any fragments of the original content that are greater than some pre-defined size (e.g., each fragment or paragraph with more than 50 words), then in order to provide an accurate and robust identification, the size of the fingerprints needs to be proportional to the size of the fingerprinted content. In large and modern organizations, this size can be huge. A substantial reduction in the size of the fingerprints, without hampering accuracy, is therefore vital especially while employing fingerprint-based detection at endpoints, such as laptops and desktops. Among other benefits, the following embodiments provide means for overcoming these obstacles.

FIG. 1 illustrates a computer network system 1000. In this system, various client machines 1001a-b interact with one another across an internal network 1002 and occasionally seek to send and receive data from the internet or an outside network 1005. The client machines may comprise various computing devices, such as laptops, cellular phones, personal digital assistants, fixed client terminals, workstations, and the like. In certain embodiments, a scanning system 1003 monitors documents transmitted across the internal network 1002. Certain documents may contain confidential information and be subjected to various security policies (number of copies, transmissions, only certain users may view, etc.) depending on the sensitivity of the subject matter they contain. When the scanning system 1003 encounters a document (say, when a user requests transmission of a file) the system 1003 will consult a "fingerprints" repository 1004. The scanning system 1003 may scan file-servers, document management systems and drives on client machines 1001a-b to identify documents. An administrator may have previously associated a given document, or document format, with a particular security policy. This association is reflected in the repository 1004 which provides a table or similar means for associating one or more fingerprints with that document's policy. The scanning system 1003 will compare the fingerprints in the repository 1004 with the fingerprints of an incoming document to determine if the incoming document is the same as the document associated with a particular security policy. If a match is determined, the system 1003 may enforce the policy associated with the matched document.

Although shown in this diagram as an intermediary between the internal 1002 and external 1005 networks, one skilled in the art will readily recognize numerous locations in which the scanning engine may operate instead. Furthermore, separate systems may scan for outgoing documents and perform the fingerprint extraction and comparison.

Figure 2:
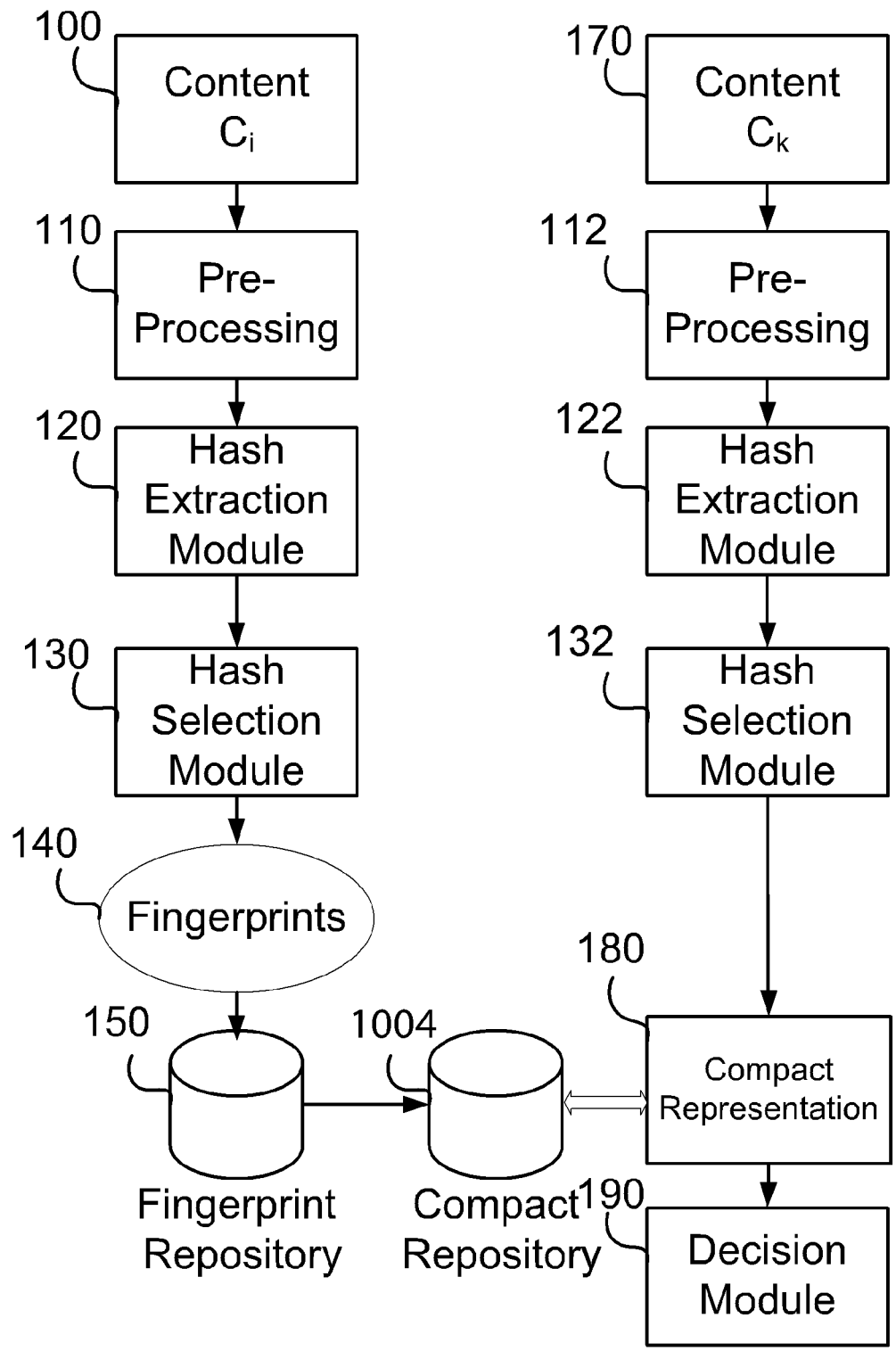
FIG. 2 is a flow diagram illustrating a method for information leak prevention employing a compact representation of the fingerprint repository.

FIG. 2 illustrates a flow diagram showing the modules that implement a method for detection, storage, and subsequent comparison and identification of fingerprints used by the scanning system 1003. Content $C_i$, 100 is pre-processed by a pre-processor 110. For example, in the case where the content is a textual document, the text may be first extracted and then canonized by bringing it up to a standard form (e.g., changing the letters to lowercase, and then removing "stop words" such as common words "the", "and", "or" etc.). After the preprocessing stage, hashes are extracted by a hash extraction module 120 and are thereafter selected by a hash selector module 130. The selected hashes, which are the fingerprints $FP(C_i)$ 140 of the content C; are stored, possibly together with a number or a string that provides an identification of the content C, and an applicable policy $PL_j$, in a fingerprint repository 150. The identification may allow correlating the fingerprints with the content. A table correlating between the identification number or string and other basic properties of the content, such as its name, location, owner etc. may be used for this purpose.

The policy that is assigned to the content may be a distribution and usage policy that determines, for example the allowed senders, allowed recipients, allowed storage devices, allowed distribution channels, and other allowed actions. In most practical situations, the distribution and usage policy is selected from a set of pre-defined organizational policies (e.g., "confidential R&D documents are not allowed to be sent to people outside the organization, and should be stored on a central file server X.").

The fact that the content C is subjected to the policy $PL_j$ is denoted by $C_j \vdash PL_j$. The collection of all the hashes from all the contents that are subjected to the same policy PLj is denoted by $FPL_j = \{FP(C_i) | C_i \vdash PL_j\}$. From all the selected hashes of the contents that share the same policy $PL_j$, a compact representation, (such as probabilistic representation, as explained below) $RP_j$ of $FPL_j$ may be created and stored at the compact repository 1004. In order to decide which policy should be applied or enforced, the system may assess the similarity between monitored content (e.g., a content that is disseminated over monitored channels such as email or instant-messaging) and content that was defined as being subjected to the various policies. In this analysis phase, new content, $C_k$, 170 (e.g., a PDF document that is attached to an outgoing email) may be analyzed. Content is first pre-processed by a pre-processor module 112. After the preprocessing stage, hashes are extracted by a hash extraction module 122 and are thereafter post selected by a hash selector module 132. (It will be recognized that in some embodiments the functionality of the modules 112, 122 and 132 can be performed using modules 110, 120 and 130, correspondingly). A compact representation of the content 180 is created and matched against the compact representation $RP_j$ of $FPL_j$ stored in the compact repository 1004. The number of matches may thereafter used by the decision module 190 to decide, based on the assessed similarity between the fingerprinted content $C_i$, and the analyzed content $C_k$, whether the policy $PL_j$ is applicable and should be enforced on $C_k$.

Figure 3:
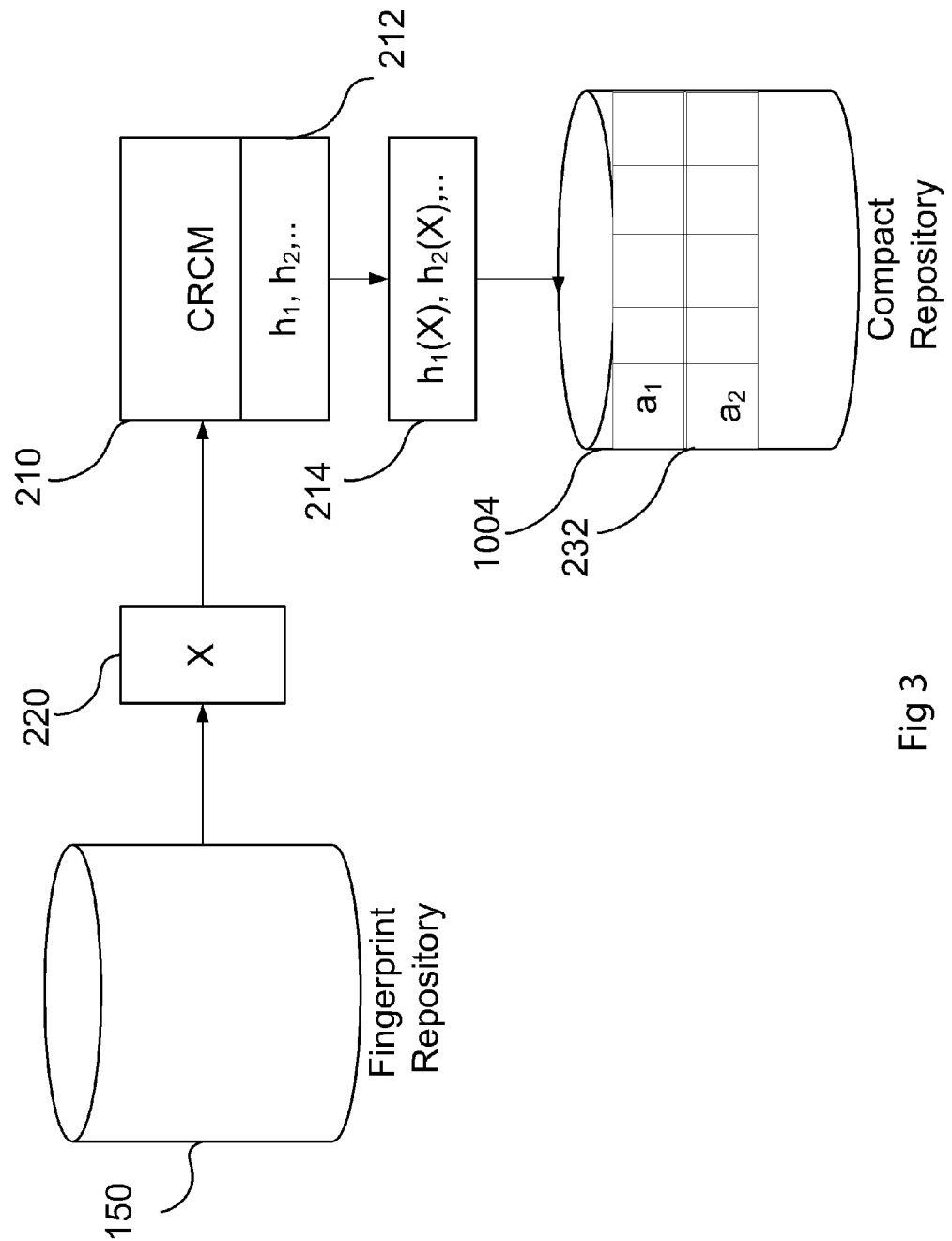
FIG. 3 is a flow diagram illustrating a method for employing an efficient and compact probabilistic representation of fingerprinted content.

Referring now to FIG. 3, a flow diagram showing the modules for utilizing an efficient and compact probabilistic representation of fingerprinted content is shown. A compact representation creation module (CRCM) 210 takes hashes X 220 from the fingerprint repository 150 and employs one or more hash-functions $h_i$, 212 to transform each hash value to an L-bits long binary number, $h_i(X)$ 214, where the distribution of the numbers may be close to uniform over the range $1:2^L$. For each of the hash-functions there is a corresponding array $a_i$, 232, of length $2^L$ that is stored in the compact representation repository 1004. The elements of the arrays are bits which are all initiated to a have a zero value. After evaluating $h_i(X)$, the element of the array $a_i$ at the address $h_i(X)$ is set to 1, that is, the element is "flagged", indicating the existence of the element X. Because the mapping of elements to addresses in the array is quasi-random, there is always the possibility of "collisions" between two different items, i.e., that:

$$h_i(X1)=h_i(X2) \text{ while } X1 \neq X2$$

The probability that a collision will occur becomes close to "1" when the number of items become substantially greater than the square root of the number of addresses (i.e., $2^{(L/2)}$), a phenomenon known as "the birthday problem". It is therefore not practical, in general, to positively indicate the existence of a certain item. However, if there is a "0" in at least one of the corresponding arrays $a_i$, then one can be certain that the item does not exist. This feature provides a "fast proof of non-existence" (consider a Bloom filter, as described in: Space/Time Trade-offs in Hash Coding with Allowable Errors, by H Bloom Burton, Communications of the ACM, 13 (7). 422-426, 1970, the contents of which are hereby incorporated herein by reference in its entirety). The search may therefore be stopped after the first "0" is encountered. Each of the arrays can therefore be considered as a "filter".

The array's optimal length (and the number of bits in the output of the hash function) is computed based on occupancy. 50% appears optimal, which requires arrays of a size around 1.44 times the number of items. Consider an element Y, which does not exist in the repository. If the array i is half occupied, then the probability that $h_i(Y)$ will match an occupied cell is ½. If there are n arrays that are occupied using different hash functions, $h_1, \ldots h_n$, then the probability of false positive (i.e., that all the cells whose addresses are $h_1(X) \ldots h_n(X)$ in the corresponding arrays will be occupied) is $2^{-n}$. The cost of reducing the probability of false positives by a factor of 2 is therefore approximately 1.5 bits per item.

Figure 4:
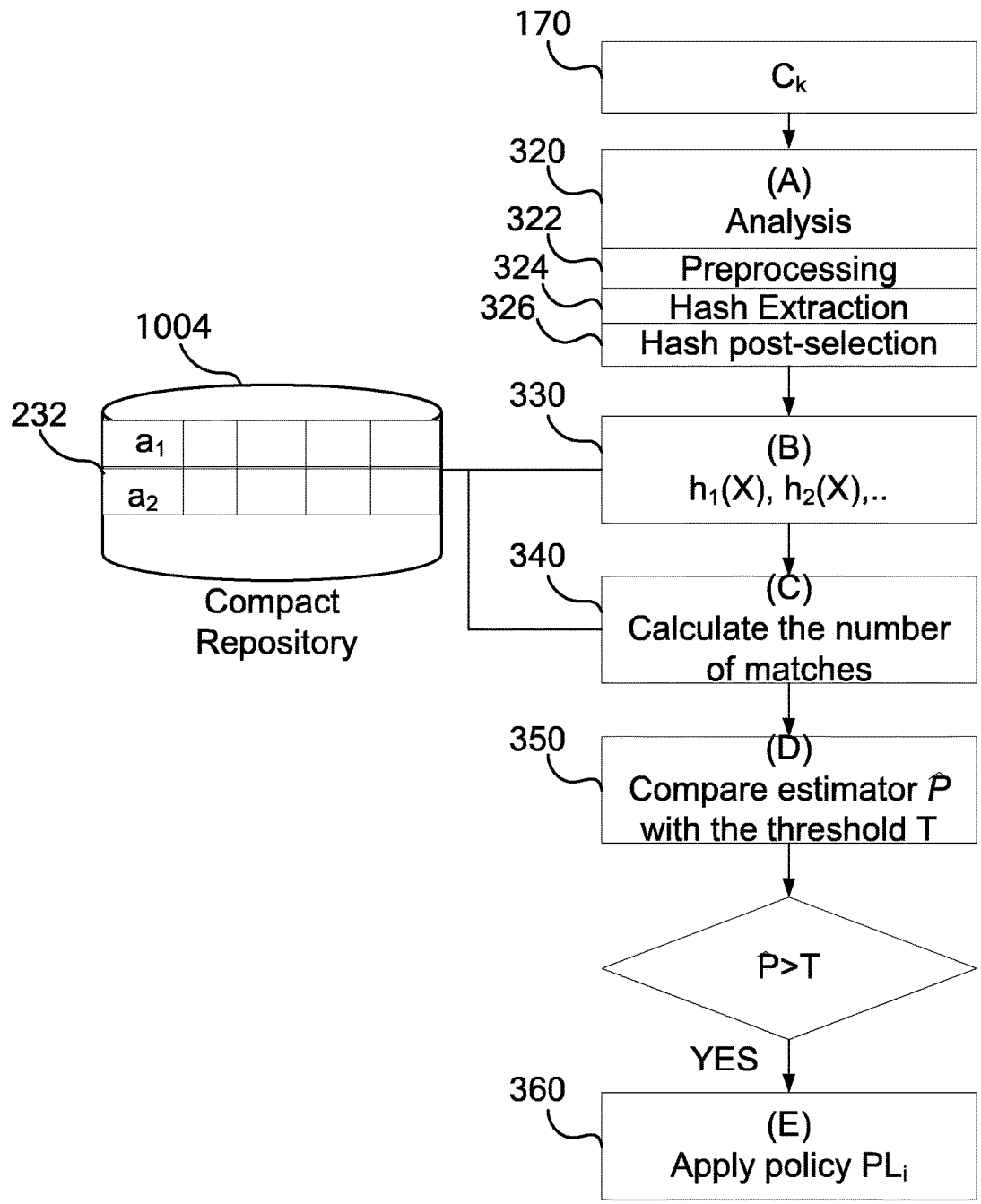
FIG. 4 is a flow diagram illustrating a method for assessing the similarity between analyzed content and fingerprinted content subjected to a certain policy.

FIG. 4 illustrates a flow diagram of a method performed by a processor for assessing the similarity between analyzed content and fingerprinted content that is subjected to a policy $PL_j$. New content $C_k$ 170 is analyzed at stage A 320. The analysis phase may comprise preprocessing 322, hash extraction 324 and hash post-selection 326. Several different hash functions, $h_1(X) \ldots h_n(X)$ may be evaluated for each post-selected hash X at stage B 330. Denote $h_i(X)=A_i$, the value $A_i$ is considered as an address in the array $a_i$, which is stored in the compact repository 1004. $a_i(A_i)=1$, for $i=1, \ldots n$ indicates positive match against the compact representation of contents subjected to $FPL_j$ stored in the compact repository 1004.

At stage C 340 the number of matches is used in order to decide whether the policy $PL_j$ is applicable and should be enforced on $C_k$. The evaluation of the number of matches will take into account the false-positives—if, out of N hashes there were pN true matches, and the probability of false positives is $P_{FP}$, than the expected number of matches is:

$$\bar{p}N=(p(1-P_{FP})+P_{FP})N$$

And the maximum likelihood estimator of p is therefore:

$$\hat{p} = \frac{\bar{p} - P_{FP}}{1 - P_{FP}}$$

For example, if it is determined that out of 100 hashes in the analyzed content, 70 have positive indications (i.e., $\bar{p}=0.7$) and the probability of false-positives, $P_{FP}$ is 0.125, then the maximum likelihood estimator of the number of matches is:

$$\hat{p} = \frac{0.7 - 0.125}{1 - 0.125} = 0.657$$

Using the above scheme, one can obtain a reasonable estimator of the similarity from an information security perspective. In real-life scenarios the implications of small differences in the similarity are negligible—trying to disseminate 65% or 70% of a confidential document have substantially the same impact.

Note that this number represents the number of matches with all the contents that share the same policy, so it might be the case that the analyzed content comprises segments from several documents that share the same policy. The method will therefore address cases in which the breached content contains segments from several confidential documents.

Figure 5:
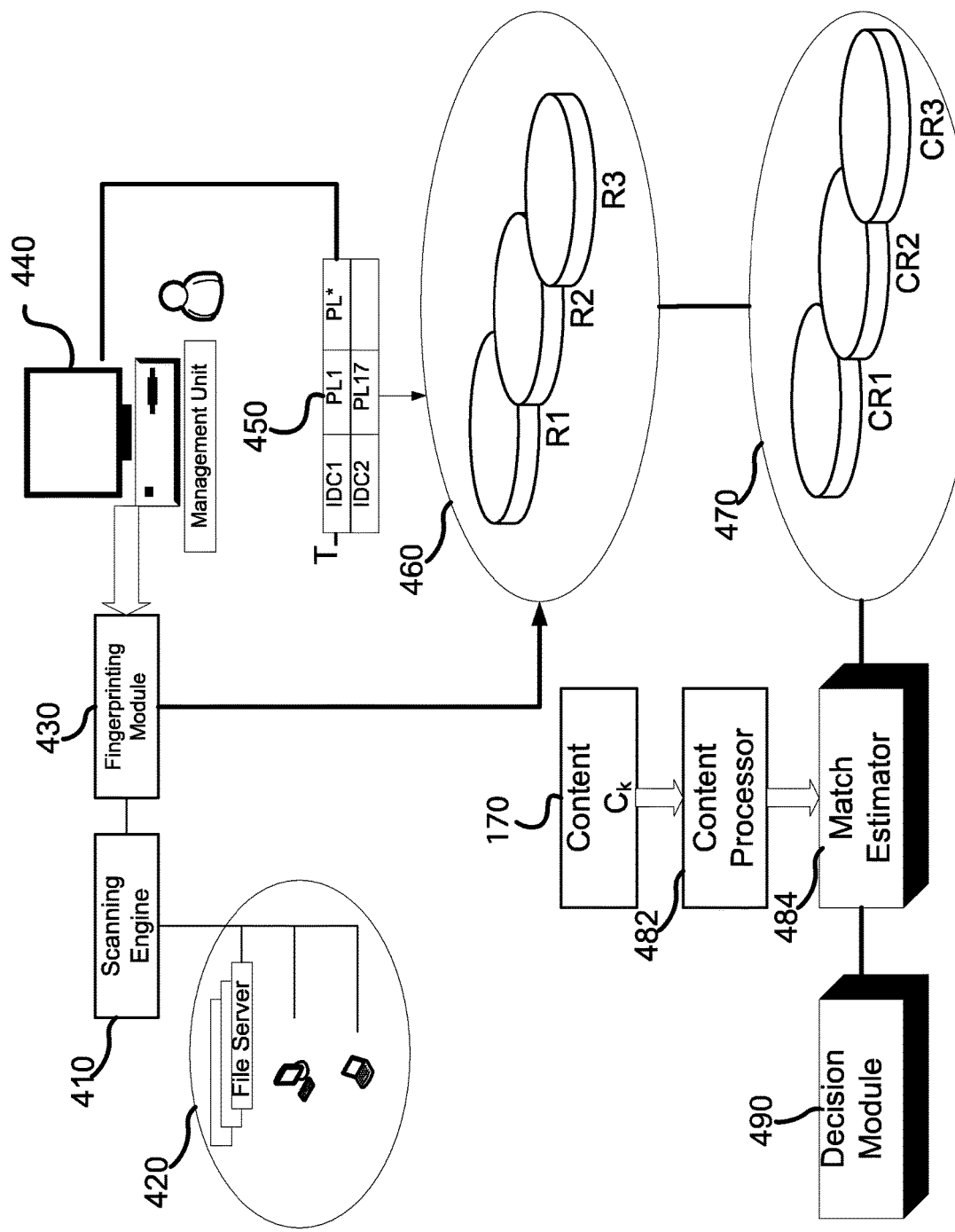
FIG. 5 is a flow diagram illustrating a method handling multiple policies.

At stage D, 350, the estimator $\hat{p}$, for the number of matches is compared against a threshold T. The threshold may be determined by a designer or system administrator as comprising the minimum probability at which a comparison will result in two documents being classified as being sufficiently similar such that the policy will be applied. In some embodiments the threshold may be automatically determined. Accordingly, if $\hat{p}>T$, then, at stage E, 360, the policy $PL_j$ will be applied on the content $C_k$. If $\hat{p}$ is less or equal than T, than the content is not subjected to the policy $PL_j$. The system can check if the content is subjected to other policies (as explained with reference to FIG. 5 below) or continue to analyze new contents FIG. 5 is a flow diagram illustrating a method where several policies, $PL_1, \ldots PL_n$ are active. A scanning engine 410 scans repositories 420 such as file-servers, document managements systems and drives of an organization. One skilled in the art will readily recognize that the scanning engine may comprise code implemented on a processor configured to scan the repositories. Alternatively, the engine may comprise firmware or hardware. The information that needs to be fingerprinted (e.g., textual information) is extracted from the contents of the repositories 420 and a set of hashes that comprises the fingerprints of the content is evaluated, as explained above for FIG. 2, using the fingerprinting module 430. Users can then provide inputs via human-machine interface (HMI) 440, in order to assign one or more of the policies $PL_1, \ldots PL_n$. Assigning a policy to a content can be done by using a table T, 450, that correlates content ID with a policy. Using the table, a set of repositories of the fingerprints of content subjected to the policies $PL_1, \ldots PL_n$, denoted by $R_1, \ldots R_n$ 460, is created. From each of these repositories a corresponding compact representation $CR_1, \ldots CR_n$, 470, is then created. When content $C_k$ 170 is analyzed, a content processor 482 pre-processes the content, extracts the hashes and post-selects a subset set of hashes, as explained above. A match estimator 484 may thereafter be used to provide the maximum-likelihood estimators of the fraction of the common hashes between the content $C_k$ and the hashes in each of the repositories $R_1, \ldots R_n$. A decision module 490 then decides the applicable policies by applying the policies for which $\hat{p}_i > T$.

In some cases, more than one policy can be found to be applicable with respect to the content $C_k$. In some cases, this can invoke conflicts. For example, one policy, say $PL_1$, may allow content distribution only to a set of recipients $RC_1$, another policy, say $PL_2$, may allow content distribution to only a second set $RC_2$ of authorized recipients. In such cases, one may solve the conflict by allowing the content to be sent only to recipients that belong to both $RC_1$ and $RC_2$.

Advantageously, this scheme can adequately address cases in which the content is derived by combining several fingerprinted contents, which are all subjected to the same policy. The compact representations $CR_1, \ldots CR_n$ may not allow one to exactly determine the actual contents to which content $C_k$ is similar. One may prefer to know the exact source document, either to get a better understanding of the case (e.g., "this document has 90% similarity to our secret business plan") or in order to reduce false positives (perhaps when the document comprises many small fragments of the different documents in Rj). This problem may be overcome by keeping the full repository of fingerprints and, if needed, comparing the fingerprints of the analyzed content with the fingerprints in this repository. This method is especially useful in cases where the compact repository is used for the protection of content in endpoints (such as laptops or desktops) and where storage space may be scarce. These endpoints may connect (at least part of the time) to a central server, which can store the comprehensive fingerprint repository.

Figure 6:
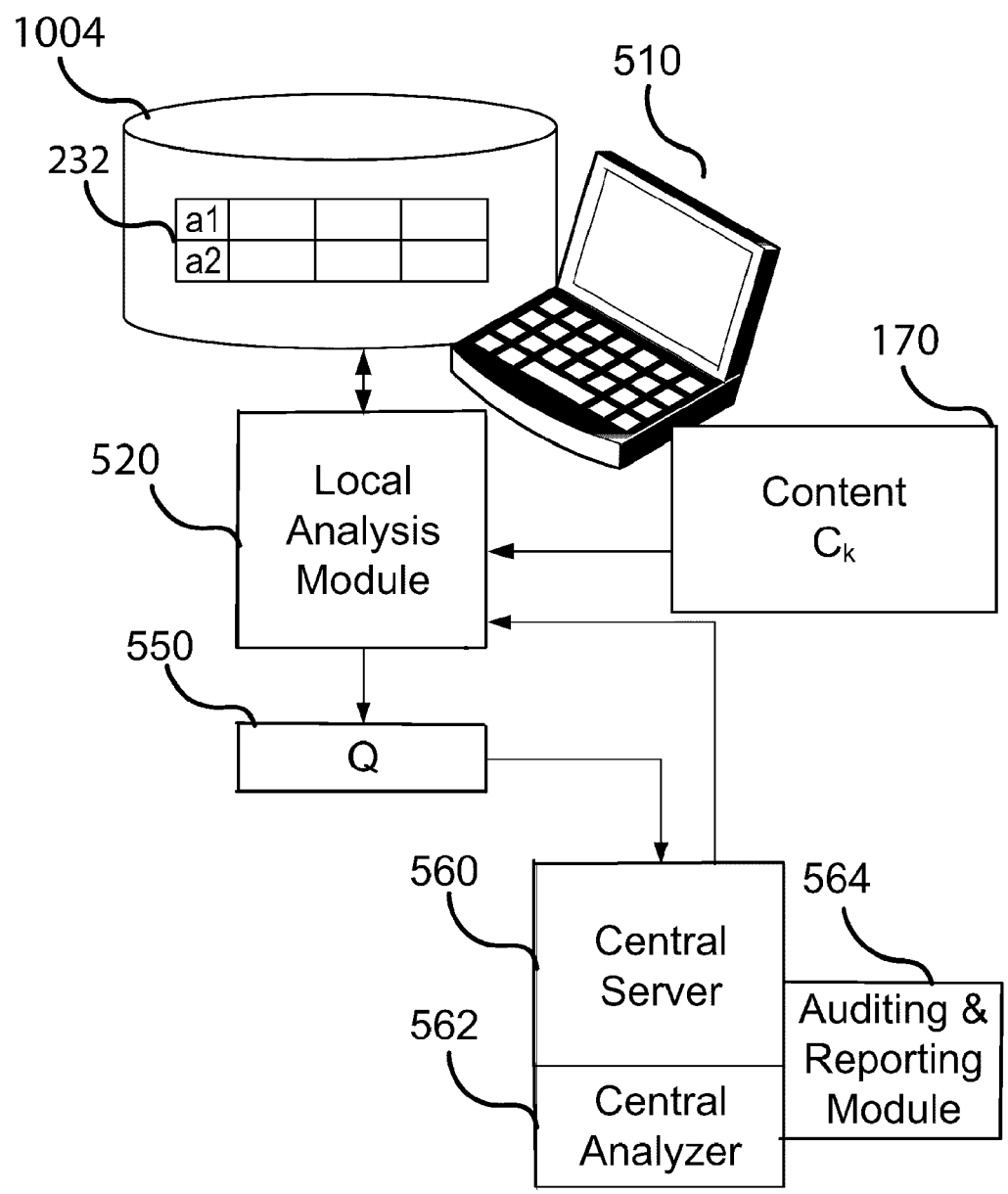
FIG. 6 is a block diagram illustrating a system that comprises both a local, compact repository on an endpoint, and a server with a repository of the original fingerprints.

FIG. 6 is a block diagram illustrating a system that comprises both a local, compact repository on an endpoint, and a server with a repository of the original fingerprints. An endpoint 510 (e.g., a laptop or desktop computer or other portable device) may be equipped with a local analysis module 520 and a local compact repository 1004. A content $C_k$ 170 is analyzed (perhaps when attempting to save the content to a portable device or send it via email) by Local Analysis Module 520. Local Analysis Module 520 first estimates the maximum likelihood estimators of the number of matched hashes with each of the compact repositories $CR_1, \ldots CR_n$, 470 as described for FIGS. 4 and 5. For each policy for which $\hat{p}_i > T$ the local analysis module 520 sends a query Q 550, to a central server 560. The server 560 then performs a full analysis using the fingerprints in the relevant repositories (i.e., all the repositories for which $\hat{p}_i > T$) using an analyzer 562 as described for FIG. 5 and returns a response that comprises the applied policies back to the endpoint 510 and to an audit and reporting module 564.

For better mitigation of false-positives, one can further use the distances between probable matches as an additional parameter for deciding what policy to apply, as illustrated in FIG. 7. Consider the case in which the content $C_k$ 610 contains a section 612, from a fingerprinted content 620, while the rest of content contains un-fingerprinted content 614. While analyzing fingerprinted part 612, all the selected hashes will induce a match, and the distances between matches will be equal to the distance between selected hashes 630. In contrast, the remainder 614 of the document may only contain intermittent hits 640. The matching hashes of unfingerprinted part 614, are false-positives and can be viewed as matches which stem from a Bernoulli process with $p = P_{FP}$. The distribution of distances between matches will therefore correspond to the distribution of the number of trails between two successes in a series of Bernoulli trails, and will be therefore geometric with an average distance of $1/P_{FP}$.

Figure 8:
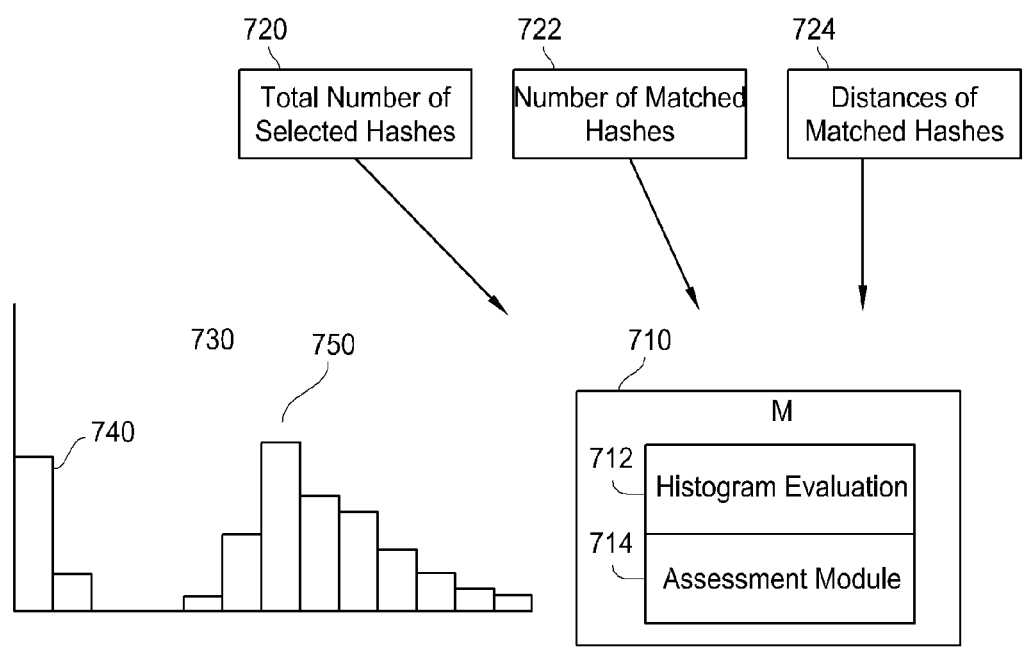
FIG. 8 is a block diagram illustrating a system which considers the distance between consecutive indications that hashes exist in order to decide whether the content contains a significant fingerprinted part.

FIG. 8 is a block diagram illustrating the operations of a module which uses the distance between hashes to decide whether the content contains a significant fingerprinted portion. A module M 710 receives as an input the total number of selected hashes 720, the number of matched hashes 722, and the distances (in terms of selected hashes) between any two consecutive matches 724. Sub-module 712 evaluates a histogram 730 of the distances. For the case described in the description of FIG. 7, the histogram will be bi-modal, with one pick 740, at "0" (i.e., match between consecutive selected hashes) and a wider pick 750 at approximately $1/P_{FP}$ (e.g., if $P_{FP} = 1/8$, the pick will be at "8"). Based on the number of matches at the first pick, an assessment sub-module 714 assesses the fraction of hashes that, most probably came from fingerprinted content, thereby reducing the chance of false positives. Note that the length of the sequences of consecutive hashes can also be used to assess the size of the sections that were probably taken from a fingerprinted content.

Figure 9:
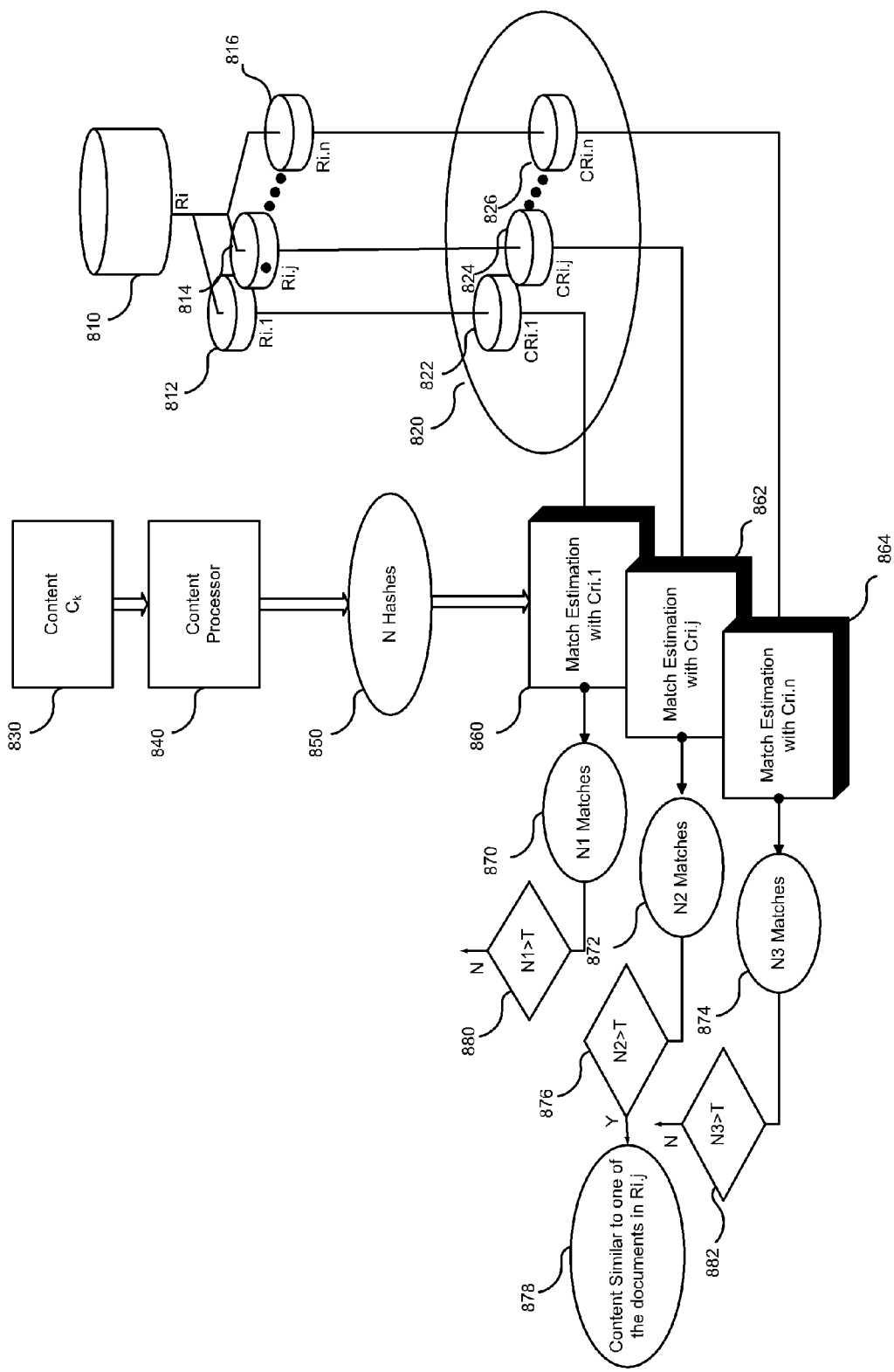
FIG. 9 is a flow diagram illustrating a method allowing for further reduction of false positives and facilitating a more efficient update mechanism.

FIG. 9 is a flow diagram illustrating a method allowing for further reduction of false positives in cases in which the analyzed document is comprised of or created from many small fragments of the different documents in $R_i$ which are small enough to be benign, and facilitates a more efficient update mechanism. The repository $R_i$ 150 comprises fingerprints of a set of documents that are subjected to a policy $P_i$ that is divided into n repositories $R_{i1}$ 812 $\ldots R_{ij}$ 814 $\ldots R_{in}$ 816, each of them representing a different set of documents chosen such that the total number of fingerprints in each of the repositories $R_{ij}$ will not exceed a certain pre-defined number M.

A set of compact repositories 820 with n compact repositories $CR_{i1}$ 822 $\ldots CR_{ij}$ 824 $\ldots CR_{in}$ 826 is derived from the repositories $R_{i1}$ 812 $\ldots R_{ij}$ 814 $\ldots R_{in}$ 816, as explained above in the reference to FIG. 3. The set 820 is thereafter used to estimate the number of matches. When content $C_k$ 170 is analyzed to determine its similarity to one of the contents in the repository $R_i$ it is pre-processed first by a content pre-processor 482, which extracts and selects N hash-values 850 as explained in the description of FIGS. 4 and 5 above. These N values are compared with the compact repositories $CR_{i1}$ 822 $\ldots CR_{ij}$ 824 $\ldots CR_{in}$ 826 using match estimators 860, 862 and 864 respectively. If the number of matches with the compact repository $CR_{ij}$ is greater than a predefined threshold T (876), then, with a high probability, the content is similar to one of the documents whose fingerprints are represented in the repository $R_{ij}$ (878), while for the other cases (illustrated as 870-880 and 874-882) the content is not similar to any one of the documents whose fingerprints are represented in the corresponding repository.

The size of the fingerprint repositories of each set may be small enough to facilitate simpler and faster content deletions and updates and to allow for incremental updates.

The sub-divisions described and illustrated in FIG. 9 above, may require that more array structures be queried. However, these queries involve only a single bit, while CPU implementations usually facilitate elementary operations with respect to at least one "byte" (8 bits). Therefore the bit-querying processes can be expedited by a factor of 8 utilizing "byte-wise queries", providing that the bit array is restructured in a manner that would facilitate such queries.

Figure 10:
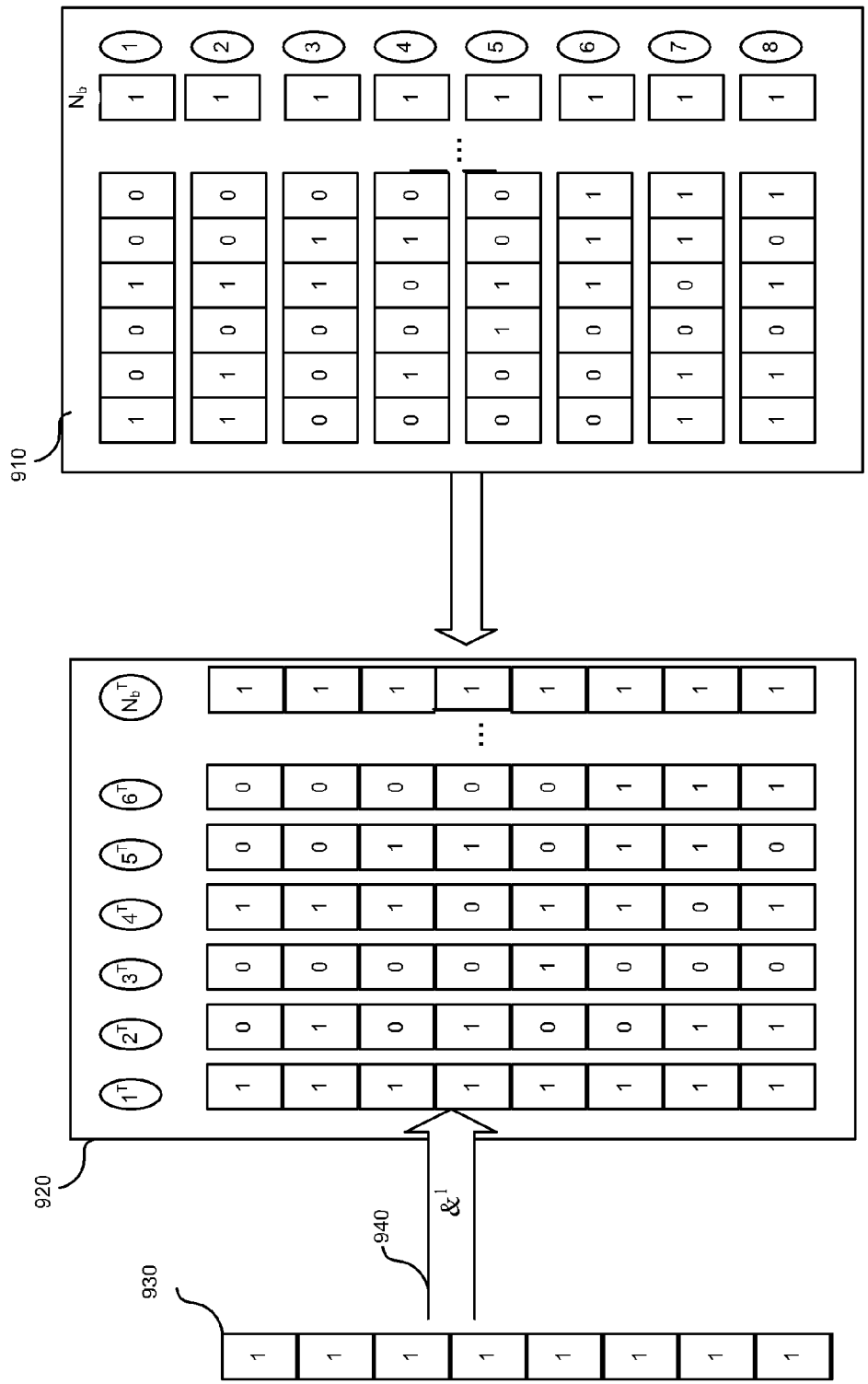
FIG. 10 is a flow diagram illustrating a method for simultaneously querying several compact repositories.

FIG. 10 illustrates a "bit-transpose" method that reduces the number of in-memory random-access read operations. The eight arrays 1-8 (910), each containing $N_b$ bits, are "transposed" into a set 920 of $N_b$ arrays set, each with 8-bits, such that $i^{th}$ bit of the $i^{th}$ array in the original set 910 is equal to the $j^{th}$ bit of the $j^{th}$ array in the new set 920. By accumulating the results from a bitwise AND with a byte register 930 that corresponds to the binary representation of 255 (i.e. 8 bits, all set to "1"), one can obtain simultaneously the status of 8 bits in the original arrays 910. This method can be further generalized by merging two 8-bit super-blocks into a 16-bit super-block and so on.

Note that the methods described above can be applied, mutatis mutandis, also for any hash-based fingerprinting method of other types of content—e.g., audio and video content, images, and drawings.

The methods and apparatus disclosed herein provide methods and systems allowing for an efficient detection of fingerprinted content. One or more steps of any of the methods described herein may be implemented in a different order than that shown while not departing from the spirit and scope of the invention. While the methods and apparatus disclosed herein may or may not have been described with reference to specific hardware or software, the methods and apparatus have been described in a manner sufficient to enable persons of ordinary skill in the art to readily adapt commercially available hardware and software as may be needed to reduce any of the embodiments of the present invention to practice without undue experimentation and using conventional techniques. One skilled in the art can appreciate that the above combinations are not exhaustive and that all reasonable combinations of the above features are hereby included in the present disclosure.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A system for managing transmission of a plurality of electronic documents over a network, the system comprising:
    a compact fingerprint repository storing a repository of compact fingerprints, the compact fingerprints based on hashes of electronic documents to which a transmission policy corresponding to the compact fingerprint is applied, the hashes of each of the compact fingerprints including a subset of a full set of hashes, the subset including only hashes that are evenly divisible by one or more specified numbers, the subset including fewer hashes than the full set of hashes;
    one or more hardware electronic processors configured to:
        determine probabilistic matches between fingerprints of an electronic document identified on the network and the compact fingerprints stored in the compact fingerprint repository, and
        determine whether to transmit the identified electronic document over the electronic network based, at least in part, on a number of matching fingerprints.

2. The system of claim 1, wherein the one or more hardware electronic processors are further configured to:
    identify a compact fingerprint matching the fingerprints of the electronic document,
    identify a policy associated with the identified compact fingerprint, and
    determine whether to transmit the identified electronic document based on the identified policy.

3. The system of claim 1, wherein the one or more hardware electronic processors are configured to determine a probabilistic match based on distances between portions of content of the electronic document corresponding to hashes matching a compact fingerprint in the repository.

4. The system of claim 3, wherein the one or more hardware electronic processors are configured to determine no match exists between a compact fingerprint and the electronic document in response to the compact fingerprint failing to represent a fingerprint of the electronic document.

5. The system of claim 1, wherein the one or more hardware electronic processors are configured to determine a first hash of the electronic document using a first hash function and determine a second hash of the electronic document using a second hash function.

6. The system of claim 5, wherein the one or more hardware electronic processors are configured to determine whether the first and second hashes are represented by a compact fingerprint in the repository, and determine the compact fingerprint does not match the electronic document if either of the hashes is not represented by the compact fingerprint.

7. A method of transmitting electronic content over a network, the method comprising:
    identifying electronic content on the network;
    generating hashes of the electronic content identified on the network;
    selecting a subset of the generated hashes, the selected including only hashes that are evenly divisible by one or more specified numbers, the subset including fewer hashes than the generated hashes; and
    determining whether to transmit the electronic content identified on the network over the network, based at least in part on a transmission policy corresponding to a compact fingerprint stored in a compact fingerprint repository matching the selected hashes.

8. The method of claim 7, wherein each compact fingerprint in the compact fingerprint repository is based on hashes of electronic documents to which the corresponding transmission policy is applied.

9. The method of claim 7, further comprising:
    identifying a compact fingerprint matching the fingerprints of the electronic document,
    identifying a policy corresponding to the identified compact fingerprint; and
    determining whether to transmit the identified electronic document based on the identified policy.

10. The method of claim 7, further comprising determining a probabilistic match based on distances between portions of content of the electronic document corresponding to hashes matching a compact fingerprint in the repository.

11. The method of claim 9, further comprising determining no match exists between a compact fingerprint and the electronic document in response to the compact fingerprint failing to represent a fingerprint of the electronic document.

12. The method of claim 7, further comprising determining a first hash of the electronic document using a first hash function and determining a second hash of the electronic document using a second hash function.

13. The method of claim 12, further comprising:
determining whether the first and second hashes are represented by a compact fingerprint in the repository; and
determining the compact fingerprint does not match the electronic document in response to either of the hashes not being represented by the compact fingerprint.

14. A non-transitory computer-readable medium comprising instructions that when executed cause one or more processors to perform a method of transmitting electronic content over a network, the method comprising:
identifying electronic content on the network;
generating hashes of the electronic content identified on the network;
selecting a subset of the generated hashes, the selected including only hashes that are evenly divisible by one or more specified numbers, the subset including fewer hashes than the generated hashes; and
determining whether to transmit the electronic content identified on the network over the network, based at least in part on a transmission policy corresponding to a compact fingerprint stored in a compact fingerprint repository matching the selected hashes.

15. The non-transitory computer-readable medium of claim 14, wherein each compact fingerprint in the compact fingerprint repository is based on hashes of electronic documents to which the corresponding transmission policy is applied.

16. The non-transitory computer-readable medium of claim 14, the method further comprising:
identifying a compact fingerprint matching the fingerprints of the electronic document;
identifying a policy corresponding to the compact fingerprint; and
determining whether to transmit the identified electronic document based on the identified policy.

17. The non-transitory computer-readable medium of claim 14, the method further comprising determining a probabilistic match based on distances between portions of content of the electronic document corresponding to hashes matching a compact fingerprint in the repository.

18. The non-transitory computer-readable medium of claim 17, the method further comprising determining no match exists between a compact fingerprint and the electronic document in response to the compact fingerprint failing to represent a fingerprint of the electronic document.

19. The non-transitory computer-readable medium of claim 14, the method further comprising determining a first hash of the electronic document using a first hash function and determining a second hash of the electronic document using a second hash function.

20. The transitory computer-readable medium of claim 19, the method further comprising:
determining whether the first and second hashes are represented by a compact fingerprint in the repository; and
determining the compact fingerprint does not match the electronic document in response to either of the hashes not being represented by the compact fingerprint.

* * * * *